United States Patent [19]
Leal et al.

[11] Patent Number: 5,311,437
[45] Date of Patent: May 10, 1994

[54] MATERIALS SELECTOR TOOL

[75] Inventors: James A. Leal; Norma A. Saenz; Gary L. Janda; Donald R. Martin; William J. Ward, Jr., all of Tucson, Ariz.

[73] Assignee: Hughes Aircraft Company, Los Angeles, Calif.

[21] Appl. No.: 827,181

[22] Filed: Jan. 28, 1992

[51] Int. Cl.$^5$ ............................................. G06F 15/46
[52] U.S. Cl. ................................... 364/468; 364/156; 364/401
[58] Field of Search ............... 364/468, 401, 402, 403, 364/578, 148, 156

[56] References Cited

U.S. PATENT DOCUMENTS

| | | | |
|---|---|---|---|
| 4,646,238 | 2/1987 | Carlson, Jr. et al. | 364/468 X |
| 4,885,686 | 12/1989 | Vanderbei | 364/402 |
| 5,033,004 | 7/1991 | Vandivier, III | 364/468 |

Primary Examiner—Joseph Ruggiero
Attorney, Agent, or Firm—Charles D. Brown; Randall M. Heald; Wanda K. Denson-Low

[57] ABSTRACT

A computer-implemented preferred materials selector tool comprises a digital processor, a data storage medium accessible by the digital processor, and a data base stored in the data storage medium having a plurality of entries for materials. At least some of the data base entries include identification of the physical character of the material, identification of a procedure in which the material is operable, and a hazard/environmental assessment. The computer-implemented tool further includes a set of instructions executable by the digital processor for controllably selecting a material from the data base responsive to a comparison with the physical character of the material, the procedure identification, or the hazard/environmental assessment.

15 Claims, 4 Drawing Sheets

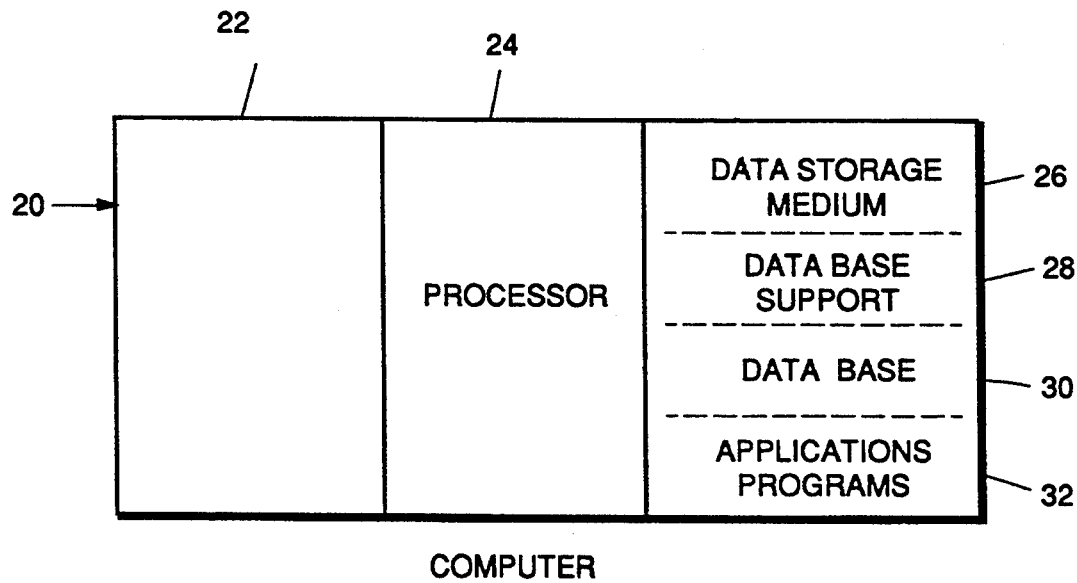
FIG. 1.
FIG. 4.
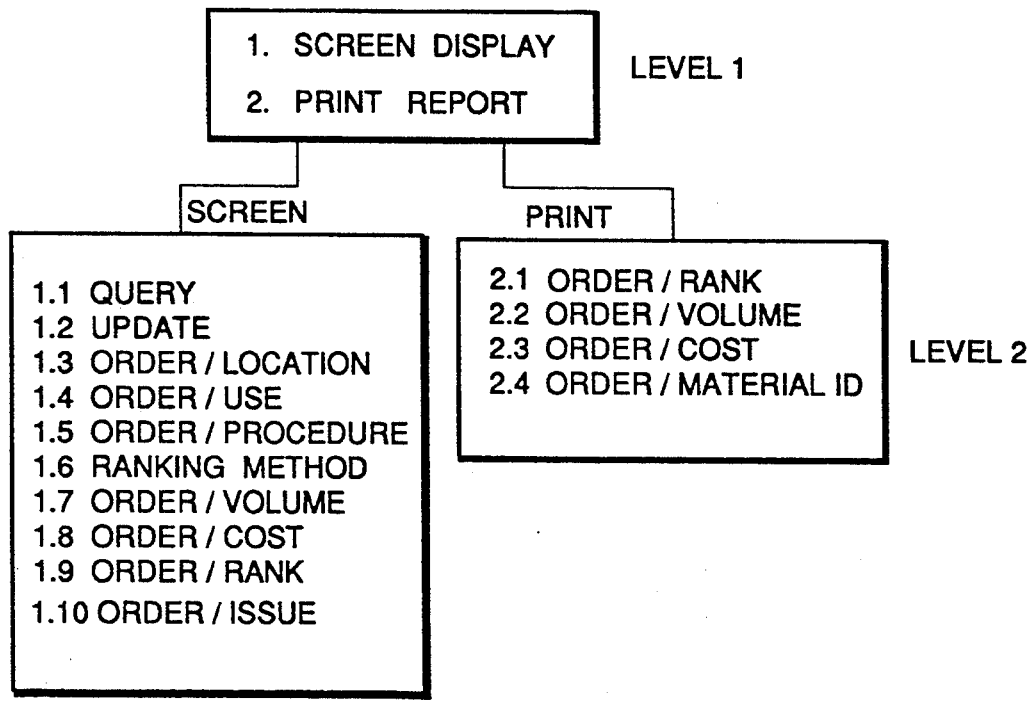

FIG. 2.

DATA SOURCES

↓

PREFERRED MATERIALS SYSTEM

CATEGORY 1: SYSTEMS AND DESIGN DATA

CONTRACT AND PERFORMANCE REQUIREMENTS
    PERFORMANCE CHARACTISTICS
    PRODUCT APPLICATION LIMITATIONS
    RISK ASSESSMENTS
    ECONOMIC ANALYSIS

CATEGORY 2: MATERIAL SPECIFICATIONS

TITLE
    NUMBER
    DESCRIPTION
    REVISION

CATEGORY 3: MANUFACTURING PROCEDURES

TITLE
    NUMBER
    DESCRIPTION
    REVISION

CATEGORY 4: MATERIALS

NAME
    INVENTORY PART NUMBER

CATEGORY 5: PRODUCTION MATERIALS DATA

DESCRIPTION
    MANUFACTURER
    COST DATA
    QUANTITY BUY
    QUANTITY ISSUE
    UNIT WEIGHT
    VOLUME USAGE
    LOCATION USED
    MATERIAL SAFETY DATA SHEETS

CATEGORY 6: RELATIVE RANKING

USER INTERFACES 40     EXISTING INFORMATION SYSTEMS AND DATABASES 42

MATERIALS SELECTOR TOOL

BACKGROUND OF THE INVENTION

This invention relates to a computer-implemented tool for selecting materials, and, more particularly, to the content of a computer-accessed data base of materials.

Materials have traditionally been selected for use in manufacturing on the basis of their suitability for accomplishing a required physical or chemical function, and their purchase cost. Safety, environmental effect, and related issues are usually considered, but only as to how they might affect the usage of the material after selection. For example, procedures for the use of a particular material often address environmental matters by indicating proper methods for disposing of excess material or its reaction products.

In recent years the concern about the effects of hazardous materials on the environment has increased, requiring that manufacturers of products devote their attention to this Issue. The proper disposal of hazardous materials aids in minimizing the adverse impacts of manufacturing operations on the environment. On the other hand, an even more effective approach is to reduce the demand for hazardous materials disposal by avoiding the use of such materials.

Studies have indicated that in some instances manufacturing standards unnecessarily require the use of hazardous materials, when non-hazardous materials might function adequately for a particular need. In some other cases, at the present state of manufacturing technology it is unfortunately not possible to eliminate materials having an adverse environmental impact entirely from many manufacturing operations. However, even in these situations studies suggest that the environmental impact of manufacturing can be reduced by carefully avoiding unnecessary disposal of hazardous materials.

An example is helpful in illustrating the possibilities for reducing unnecessary disposal of hazardous materials. High-performance curable adhesives have a finite shelf life, after which they must be discarded as unusable. A typical large manufacturing operation can produce many types of parts or products for many different customers, some of which have their own product requirements. Such a large scale operation may involve manufacturing procedures which, when considered individually, require that the manufacturer stock, for example, ten different adhesives, some of which are used often and some of which are used occasionally. The adhesives are purchased and stocked in at least minimum quantities, regardless of how often they are used. If some of the seldom-used adhesives become unusable through expiration of their shelf lives, the unusable portion must be disposed of in an environmentally acceptable manner.

Careful control of inventory can reduce the amount of adhesive that becomes unusable through expiration, but the present invention is not concerned with business practices of that type. On the other hand, if the number of adhesives which must be stocked could be reduced to some smaller number, say three, all of which are used frequently, by careful materials selection, it is less likely that any of the adhesive material would become unusable through expiration of its shelf life, thereby reducing the amount of hazardous waste that must be disposed of. It is certainly preferable to avoid having to dispose of the waste at all, rather than being concerned solely with its proper disposal. Many other examples can be cited in which careful attention to the interrelation of the characteristics of materials and engineering design can reduce the need to dispose of hazardous materials used in the manufacturing operations.

In large scale industrial manufacturing operations, the numbers of different materials, applications, materials utilization procedures, and manufacturing specifications from different customers is often so great that it is a practical impossibility to integrate hazardous waste minimization efforts with the engineering program. These issues to be considered often change as improved materials are discovered, or as specifications change to meet new needs and requirements, for example. Those responsible for engineering, design, and manufacturing simply cannot keep track of the many materials, procedures, and specifications (and their changes) so that informed materials selections can be made.

There is a need for an improved approach to integrating environmental waste minimization into product design and manufacturing operations. Such an approach should be capable of great flexibility in use and be readily understood by those who use it. The present invention fulfills this need, and further provides related advantages.

SUMMARY OF THE INVENTION

The present invention provides a materials selector tool that is usable by systems engineers, designers, manufacturing engineers, waste disposal experts, and others for use in minimizing hazardous waste while producing technically acceptable products. The selector tool can be modified and updated with information from many sources. It is highly flexible in use, and permits consideration of the hazardous waste minimization effort from many different aspects.

In accordance with the invention, a computer-implemented preferred materials selector tool comprises a digital processor, a data storage medium accessible by the digital processor, and a data base stored in the data storage medium. The data base comprises a plurality of entries for materials. At least some of the data base entries include identification of the physical character of the material, identification of a procedure in which the material is operable, and a hazard/environmental assessment. The selector tool further includes selection means executable by the digital processor for controllably selecting, and optionally displaying in a preselected manner that is useful in making a materials selection decision, a material from the data base responsive to a comparison with the physical character of the material, the procedure identification, the end-product specifications, the product/performance risk, or the hazard/environmental assessment. The selection may also be made on other factors such as end product specification and product performance risk.

The content of the materials entries in the data base is chosen so that the information may be selected, arranged, and displayed in a manner useful in making materials selection decisions. The computer-implemented data base achieves results that could not be achieved if the data base were implemented in a manual form. In a test, a materials selector tool was constructed in accordance with the invention. About 1700 different materials were entered, with each material provided a unique code indicative of its physical character and applications, and with each material provided a cross reference to applicable manufacturing procedures. Various assessments of safety and environmental impact of the materials were also included. All of this information was previously available, but not in a sufficiently useful form to permit an organized effort to include environmental effects as a routine consideration in materials selection. In the judgment of the inventors, if more than about 200 materials are to be considered, it is simply not possible to integrate the engineering and waste minimization efforts in a viable manner, without the computer-implemented tool. Using the tool of the invention, materials selection alternatives of acceptable technical character are readily identified and recommendations made that minimize adverse safety and environmental waste disposal consequences.

The present invention therefore provides an important advance in the art, by providing a new tool that can be used in a variety of ways to achieve integration of technical manufacturing operations with safety and environmental impact considerations. Other features and advantages of the invention will be apparent from the following more detailed description of the invention, taken in conjunction with the accompanying drawings, which illustrate, by way of example, the principles of the invention.

BRIEF DESCRIPTION OF THE DRAWINGS

FIG. 1 is a block diagram of a preferred materials selector tool;

FIG. 2 is a diagrammatic depiction of the content of the materials data base entries and the interactive aspects of the data base;

FIG. 4 is a diagrammatic indication of the arrangement of alternatives under a menu-driven data base approach.

DETAILED DESCRIPTION OF THE INVENTION

Figure 3:
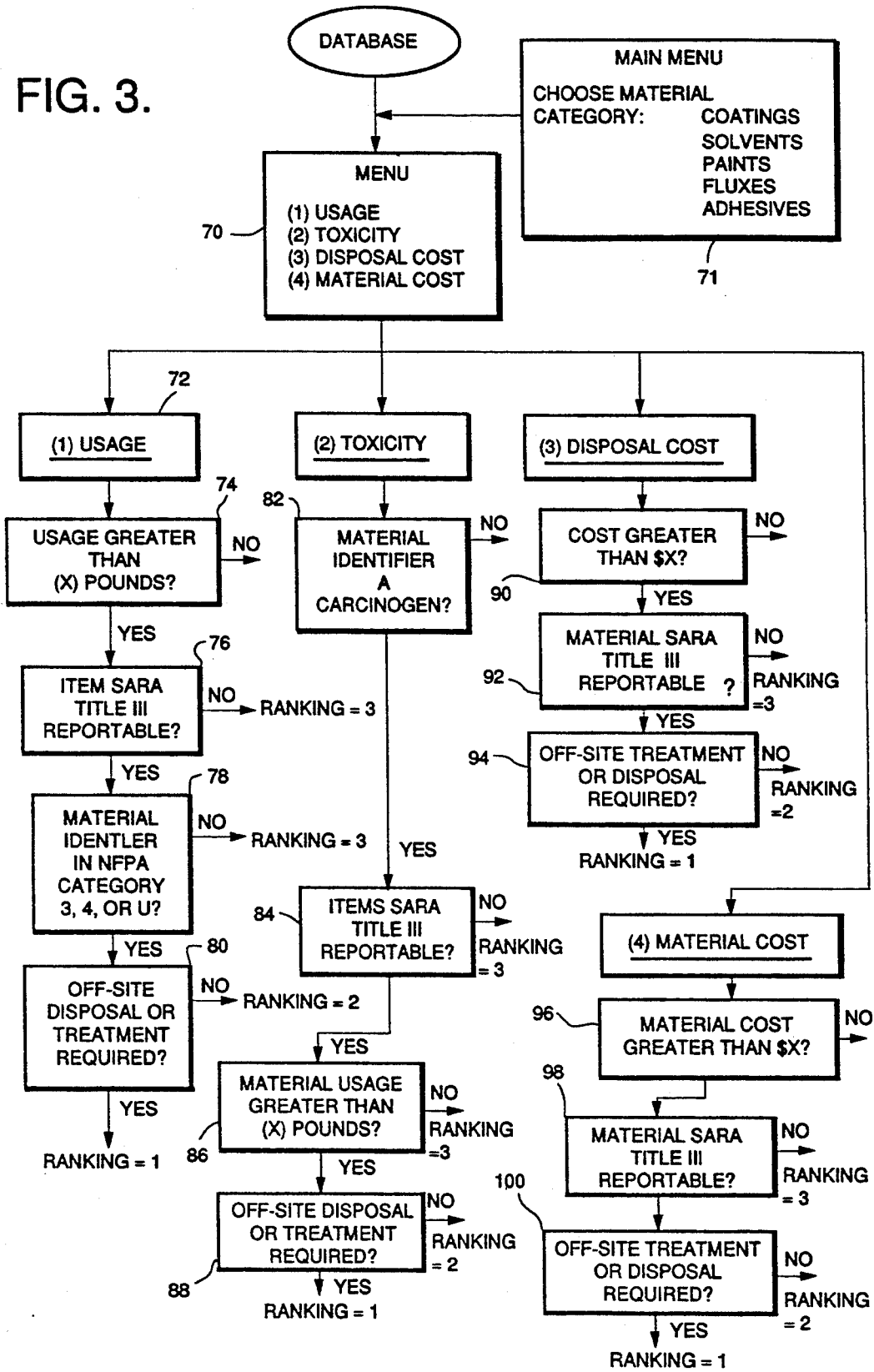
FIG. 3 is an illustrative logic diagram for a relative ranking system for materials based on safety and environmental issues.

FIG. 1 diagrammatically depicts a preferred materials selector tool 20. The materials selector tool 20 includes a computer 22 having a digital processor 24 and a data storage medium 26 that is accessible by the digital processor. The data storage medium 26 is preferably nonvolatile, and may be wholly internal or may include an external storage device such as an external disk unit. In a preferred implementation of the materials selector tool 20, the computer was an IBM PC clone, the digital processor 24 was a 486 microprocessor, and the data storage medium 26 was a hard disk storage medium with a storage capacity of 80 megabytes. This microcomputer was chosen for demonstration purposes, and any operable computer with sufficient capability may be utilized. In particular, it is expected that the materials selector tool will be further implemented on a networked computer having multiple-user access.

The data storage medium 26 contains a data base support program 28, a data base 30, and applications programs 32. A number of data base support programs are available commercially. The Oracle(R) data base support program available from Oracle Corporation was selected for the preferred implementation of the materials selector tool, because of its capability and operability with a variety of computer systems.

FIG. 2 illustrates the data base 30, which is stored in the data storage medium 26 and includes a plurality of materials entries. The preferred content of each of the entries is depicted within the data base 30. In this preferred form, there are six categories of information. The first category relates to top level systems and design information such as contract and performance requirements, performance characteristics, project application limitations, risk assessments, and economics analyses.

The next two categories are types of procedures in which the material is operable. The second category includes references to material specifications such as would be specified by a customer or by the product manufacturer that is the typical user of the data base 30. Such material specifications can be well-known and in general use, such as MIL-STDs, a custom specification defined by a customer, or a specification defined by the data base user and selected by a customer. Such a material specification generally defines the requirements of a part or process that is used in a manufacturing operation, and is used to ensure uniformity in manufactured products. The third category includes references to manufacturing procedures that are provided by the product manufacturer and, in some cases, a material vendor. Such a manufacturing procedure typically defines in great detail the exact approach to using a particular material or performing a particular process, which approach is utilized in accomplishing a requirements of the specification Identified in the second category.

The fourth category includes a reference to a material, preferably by some unique identifier that is used throughout the manufacturer's organization. The unique material identifier permits the information of the data base to be integrated with other data bases or information of the manufacturer in an automated manner.

To cite a specific example that illustrates the content of categories 2-4, the category 2 specification may state that two pieces of material are to be joined with an adhesive having a stated strength, toughness, and temperature dependence of properties. The category 3 manufacturing procedure would then define the exact steps of cleaning the surfaces, mixing an adhesive, applying the adhesive, curing the adhesive, and disposing of excess adhesive in an environmentally acceptable manner. The category 3 manufacturing procedure would also typically indicate safety considerations such as preparations required by the person performing the procedure to avoid injury. The category 2 specification and the category 3 manufacturing procedure exist independently, but some category 3 manufacturing procedure is required to implement some or all of the category 1 specification. Category 4 indicates a material that is operable with the category 3 manufacturing procedure to accomplish the category 2 specification.

The data base entries are organized around the category 4 information. There is a separate data base entry for each individual material. Each material may have more than one entry, because each material may satisfy more than one manufacturing procedure and specification. Also, there may be more than one material that satisfies each manufacturing procedure and specification.

Category 5 provides information about the material, such as an identification of its physical character and its manufacturer, cost, quantity bought at each purchase, quantity issued from storage each time the material is to be used, the unit weight of a prepackaged material, the volume usage of the material (e.g., pounds or units per month), the location of the manufacturing operation where the material is to be used, safety information, and environmental information such as the type and cost of disposal. These types of information are meant to be exemplary only, and other similar information may be included in the category 5 information.

Category 6 includes a relative ranking of the material on a safety/environmental scale. This ranking provides a quick indication of the degree to which the material might pose a hazard either to personal safety or to the environment.

An example of a ranking procedure is illustrated in FIG. 3, but any other ranking procedure suitable to a particular manufacturer/user can be substituted. The ranking procedure is menu driven, numeral 70, so that rankings can be made by usage, toxicity, disposal cost, and/or material cost. These rankings are applied to a material category 71. In these rankings, a "1," represents a high level of priority for attention, a "2" is a medium level, and a "3" is a low level of priority.

A potentially hazardous material may become significant simply due to its large volume of usage. If the usage ranking is selected at numeral 70, the user first supplies a level of significance, numeral 72. The data base is searched to identify those materials with usage greater than that amount, numeral 74. Those materials with lesser usage are omitted from further consideration. If the material has usage greater than the identified level of significance but is not required for reporting under the SARA (Superfund Amendments and Reauthorization Act), Title III, it is ranked "3", numeral 76. If the material has usage greater than the identified level of significance, is required for reporting under SARA, but is not identified in NFPA (National Fire Protection Association) category 3, 4, or U, it is ranked "3", numeral 78. If the material has usage greater than the identified level of significance, is required for reporting under SARA, is identified under NFPA, and is not required for disposal or treatment off site, it is ranked "2", numeral 80. Finally, If the has a usage greater than the identified level of significance, is required for reporting under SARA, is identified in NFPA, and is required for off-site disposal or treatment, it is assigned a "1" ranking, numeral 80.

Similar ranking procedures are followed for toxicity, disposal cost, and material cost. The ranking on toxicity is based upon whether the material is identified as a carcinogen, numeral 82, is required for reporting under SARA, numeral 84, has a material usage greater than the level of significance, numeral 86, and requires off-site disposal or treatment, numeral 88. The ranking on disposal cost is based upon whether the material has a cost greater than a level of significance, numeral 90, whether the material is required for reporting under SARA, numeral 92, and whether off-site treatment or disposal is required, numeral 94. The ranking on material cost is based upon whether the material cost is greater than a level of significance, numeral 96, whether the material is required for reporting under SARA, numeral 98, and whether off-site treatment or disposal is required, numeral 100. As noted, these ranking schemes are presented for information, and other such approaches are within the scope of the invention.

The data base support program 28 provides for a user interface 40 and for an interface 42 to existing information systems and data bases. Information may be entered into the data base to complete the Category 1-5 entries either manually through the user interface 40 or in an automated fashion through the interface 42.

The user interface 40 also permits a person who wishes to use the material selection tool 20 to gain access to the information in the data base and to utilize that information to select preferred materials to meet particular specifications or manufacturing processes. The preferred Oracle data base support program 28 provides for a menu driven choice of user applications programs 32. That is, within the framework of the Oracle data base support program, the user defines a series of applications programs that are reached by a menu tree in the Oracle support program. Both the Oracle data base support program and the applications programs are resident in the data storage medium.

FIG. 4 depicts a hierarchy of applications programs 32 reached through the menu provided by the data base support program. At level I, the user selects whether data base entries are to be displayed (selection 1) on a computer screen or to be printed (selection 2) in a report. If the user selects the display option, a level II menu presents a number of applications programs. For the preferred materials selector tool, the level II display applications programs include a sub menu of screen windows into the data base entries (selection 1.1), a material query screen where the materials entries are updated (selection 1.2), an ordering of the materials by location of use (selection 1.3), an ordering of the materials by the manufacturing procedure that uses the material (selection 1.4), an ordering of the materials by the specification that uses particular manufacturing procedures (selection 1.5), the method of calculating the safety/environmental ranking (selection 1.6), an ordering of the materials by volume of use (selection 1.7), an ordering of the materials by cost (selection 1.8), an ordering of the materials by safety/environmental ranking (selection 1.9), and an ordering of the material by its issuances from storage (selection 1.10).

If the user selects the report (2.0) option at level I, a level II menu presents a number of reporting applications programs. For the preferred materials selector tool, the level II display applications programs include reports wherein the materials are ordered by safety/environmental ranking (selection 2.1), volume of use (selection 2.2), cost (selection 2.3), or material Identifier (selection 2.4). Copies of the listings of the level II applications programs utilized in the preferred implementation of the materials selector tool are contained in the file of this application in the Patent Office. There are no level I applications programs, as these selections are provided by the Oracle data base support program.) Other applications programs may be readily prepared and added within this framework.

In an application of the present invention to waste minimization and control, the materials selector tool was used to locate all of the locations within a facility where the potentially hazardous chemical toluene was stored and in use, so that the number could be reduced. The materials selector tool database was searched for toluene and its exact location, which was a part of the database. The entire search required about 20 minutes to locate precise locations for all of the hazardous chemical and provide a printout. Locating the chemical would have required at least several days of personal contacts and interviews with each major organization and process operation. The present approach permits even more sophisticated material selection procedures with no additional searching effort. For example, if in the above case, the search had required locating the toluene purchased from a particular manufacturer in a particular size packaging and similar to that previously used on a particular program, such information could have been readily determined.

Figure 5:
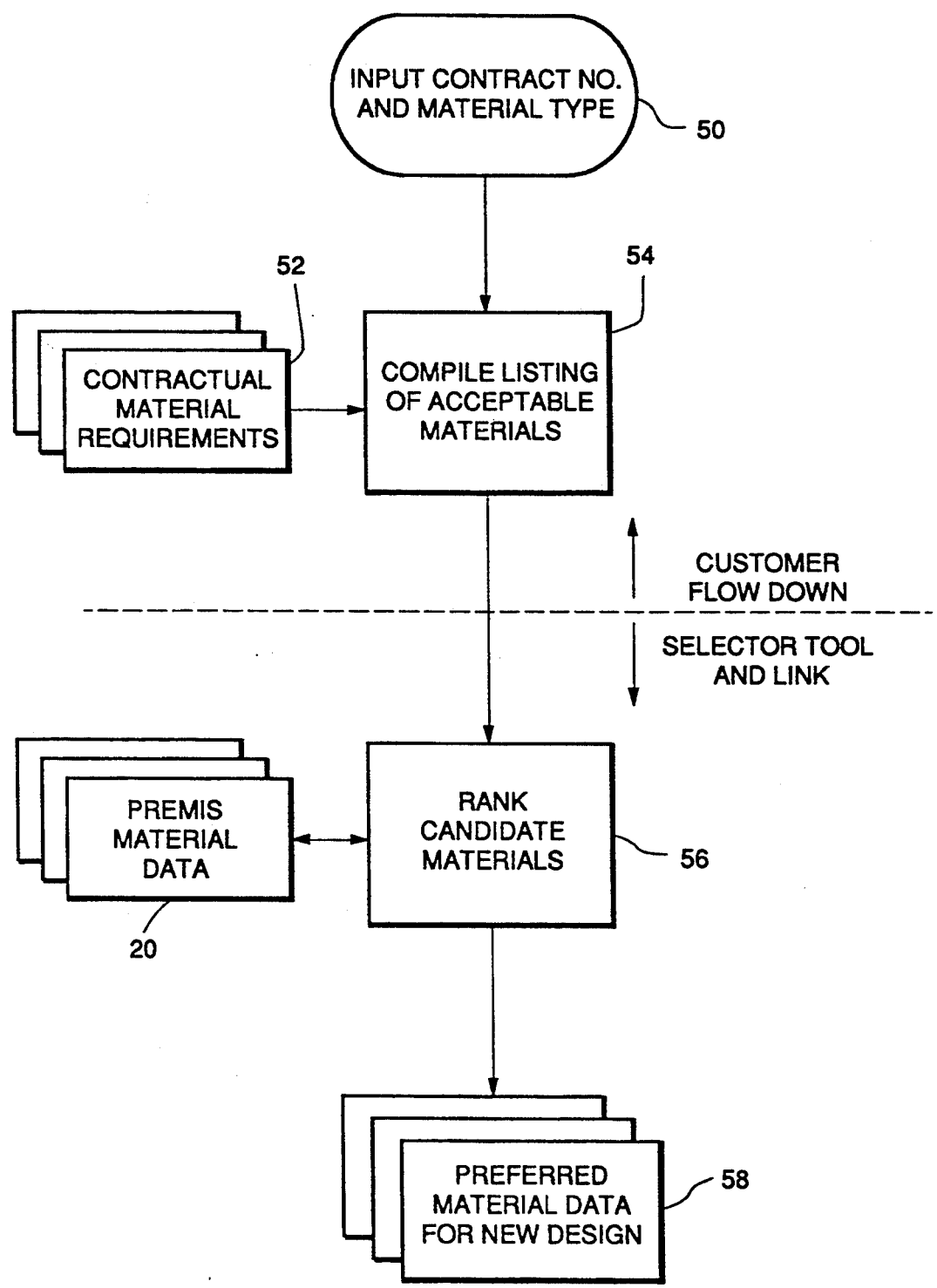
FIG. 5 is a block diagram representation of the linking of the materials selector tool of the invention with higher level engineering design.

The material selector tool of the invention can be used in a stand alone function or linked to a higher level analysis function, and FIG. 5 depicts such a linkage. Some customers of a manufacturing operation may require the application of particular specifications to all of their work. Flow down analyses are known in the art to identify acceptable materials for the manufacturing of products to be provided to these customers. In such a flow down analysis, FIG. 5, the program identifier and general material type (e.g., adhesives for the xyz program) are provided by a user, numeral 50. The analysis determines the appropriate specifications mandated by the customer, numeral 52, and compiles a list of materials that would be acceptable to the customer, numeral 54. The preferred materials selector tool 20 is operated in the manner previously discussed, numeral 56, to identify materials preferred by the manufacturer. The two lists, materials preferences of the manufacturer and materials acceptable to the customer, are compared to identify the preferred materials for use in performing the required manufacturing operations, numeral 58.

This linkage of customer requirements and manufacturer preferences achieves a materials ranking that cannot be practically achieved in any other manner. For example, MIL-STD-454, REQ 23 and its subtier documents list over 225 different adhesives for use in electrical applications. This list of materials acceptable to the customer is compared with the preferred materials list of the manufacturer as determined by the preferred materials selector tool, to identify the materials that are preferably used in meeting the needs of the customer who specifies that adhesives must meet MIL-STD-454, REQ 23.

The present invention provides a preferred materials selector tool that may be used in minimization of hazardous waste, engineering design, and other applications. Although particular embodiments of the invention have been described in detail for purposes of illustration, various modifications may be made without departing from the spirit and scope of the invention. Accordingly, the invention is not to be limited except as by the appended claims.

What is claimed is:

1. A computer-implemented preferred materials selector tool, comprising:
    a digital processor;
    a data storage medium accessible by the digital processor;
    a data base stored in the data storage medium, the data base comprising a plurality of entries for materials, at least some of the data base entries including
        identification of the physical character of the material,
        identification of a procedure in which the material is operable, and
        a hazard/environmental assessment; and
    selection means executable by the digital processor for controllably selecting a material from the data base responsive to a comparison with the physical character of the material, the procedure identification, or the hazard/environmental assessment.

2. The selector tool of claim 1, wherein at least some of the data base entries further include a consumption history of the material.

3. The selector tool of claim 1, wherein at least some of the data base entries further include a source of availability of the material.

4. The selector tool of claim 1, wherein the hazard/environmental assessment is responsive to the cost of disposal of the material.

5. The selector tool of claim 1, wherein the hazard/environmental assessment is responsive to a determination of the effect of the material on the human body.

6. The selector tool of claim 1, further including
    flag means executable by the digital processor for preventing the selection of a material by the means for selecting.

7. The selector tool of claim 1, further including
    prioritizing means executable by the digital processor for establishing a priority among the materials selected by the selection means.

8. The selector tool of claim 1, further including
    display means for displaying the entries of the data base selected by the selection means in a preselected format meaningful to a materials selection decision.

9. The selector tool of claim 1, wherein the data base includes entries for at least about 200 materials.

10. A materials selector tool implemented with a digital processor and a data storage medium accessible by the digital processor, the tool comprising:
    a data base stored in a data storage medium, the data base comprising a plurality of entries for materials, at least some of the entries including
        identification of the physical character of the material,
        identification of a procedure in which the material is operable, and
        a hazard/environmental assessment; and
    selection means executable by a digital processor for controllably selecting a material from the data base responsive to the physical character of the material, the procedure identification, or the hazard/environmental assessment.

11. The selector tool of claim 10, wherein at least some of the data base entries further include a consumption history of the material.

12. The selector tool of claim 10, wherein at least some of the data base entries further include a source of availability of the material.

13. The selector tool of claim 10, wherein the hazard/environmental assessment is responsive to the cost of disposal of the material.

14. The selector tool of claim 10, wherein the hazard/environmental assessment is responsive to a determination of the effect of the material on the human body.

15. The selector tool of claim 10, wherein the data base includes entries for at least about 200 materials.

* * * * *